(12) United States Patent
Greene

(10) Patent No.: US 9,992,993 B1
(45) Date of Patent: Jun. 12, 2018

(54) HUNTING CALL

(71) Applicant: Robert D Greene, Sophia, NC (US)

(72) Inventor: Robert D Greene, Sophia, NC (US)

( * ) Notice: Subject to any disclaimer, the term of this patent is extended or adjusted under 35 U.S.C. 154(b) by 0 days. days.

(21) Appl. No.: 15/411,208

(22) Filed: Jan. 20, 2017

Related U.S. Application Data

(60) Provisional application No. 62/280,854, filed on Jan. 20, 2016.

(51) Int. Cl.
*A63H 5/00* (2006.01)
*A01M 31/00* (2006.01)
*G10K 1/06* (2006.01)

(52) U.S. Cl.
CPC .............. *A01M 31/004* (2013.01); *A63H 5/00* (2013.01); *G10K 1/06* (2013.01)

(58) Field of Classification Search
CPC .......... A01M 31/004; A63H 5/00; G01K 1/06
See application file for complete search history.

(56) References Cited

U.S. PATENT DOCUMENTS

| | | | |
|---|---|---|---|
| 823,713 A * | 6/1906 | Chein | A63H 5/00 446/422 |
| 976,718 A * | 11/1910 | Bartholomae | A63H 5/00 446/422 |
| 2,280,582 A * | 4/1942 | Hoeflich | A63H 5/00 156/250 |
| 2,616,218 A * | 11/1952 | Brown | A63H 5/00 34/58 |
| 3,019,553 A * | 2/1962 | Gomez | G10K 3/00 446/422 |
| 4,940,451 A | 7/1990 | Leady | 446/208 |
| 5,555,664 A | 9/1996 | Shockley | 43/1 |

* cited by examiner

*Primary Examiner* — John Ricci
(74) *Attorney, Agent, or Firm* — MacCord Mason PLLC

(57) ABSTRACT

A system, apparatuses, and methods for an animal call are shown and described. A hunting call of the present disclosure may include a base, a radiating arm having an attachment point to the base, a bottom click and a top click. The radiating arm may be resilient at one end to suspend the top click above the bottom click. The top and bottom click may be aligned to allow an interface of the top and the bottom click.

20 Claims, 2 Drawing Sheets

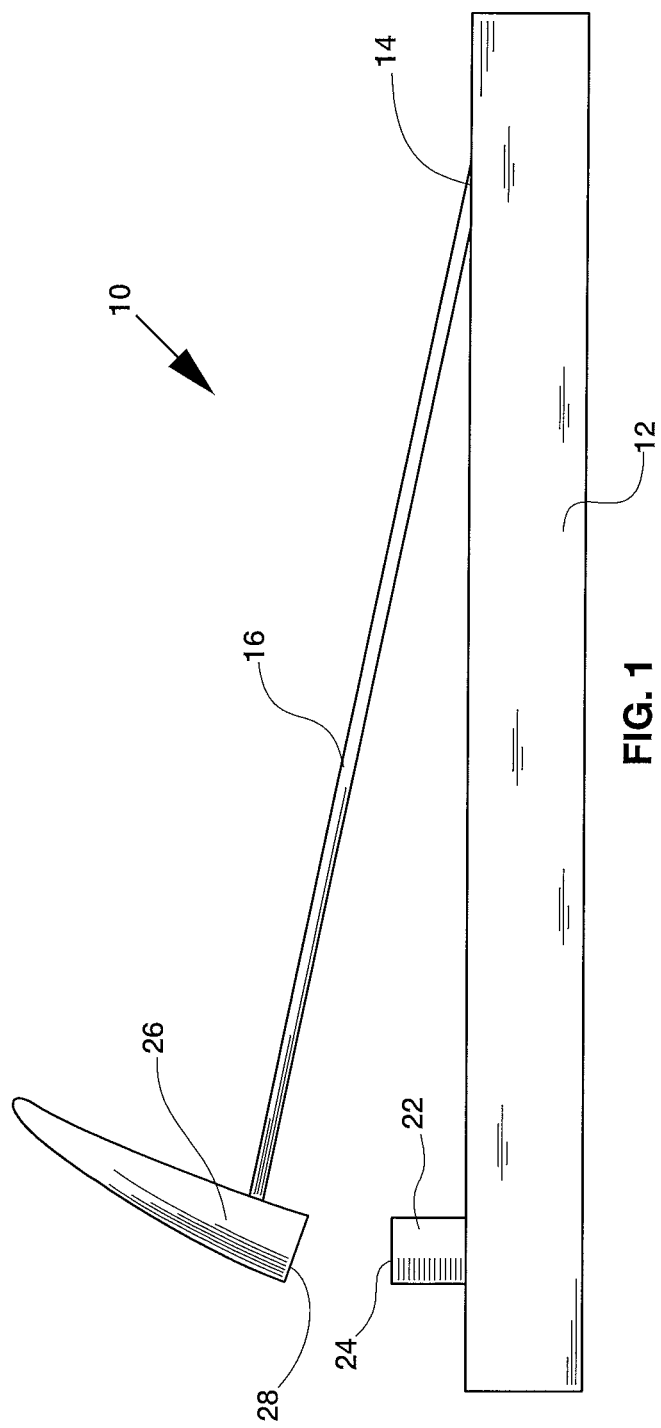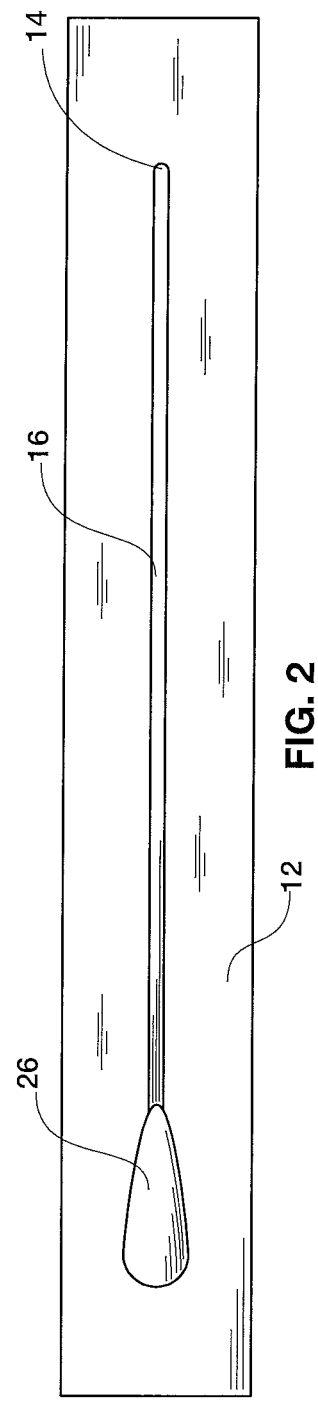

HUNTING CALL

This application claims the benefit of U.S. provisional application No. 62/280,854, filed Jan. 20, 2016, which is incorporated herein by reference.

FIELD OF THE TECHNOLOGY

The present disclosure relates generally to hunting calls and, more particularly, to a hunting call apparatus for mimicking animal sounds.

BACKGROUND

Many types of hunting calls are known in the art. However, calls are often extremely expensive, do not work effectively and/or are difficult to handle while handling other hunting equipment.

Applicant desires a hunting call that more effectively draws animals to the hunter and retains an ease of use. By way of example, Applicant desires a hunting call that more effectively draws deer to the hunter.

Thus, Applicant realizes there remains a need for a new and improved animal call which is economical, compact and easy to handle and more efficient at luring animals to a location.

SUMMARY

In accordance with the present disclosure, a hunting call apparatus and method are provided for attracting animals, mimicking animal sounds and the like. This disclosure provides improved hunting call devices, assemblies and methods that are convenient, efficient, and safe for the user.

Accordingly, one aspect of the inventions of the present disclosure is to provide a hunting call including: (a) a base having a top surface, a height, and a length; (b) a radiating arm attaching to the top surface; (c) a bottom click attached to the base; and (d) a top click attached to the radiating arm.

The bottom click may include a click interface. The top click may include a click interface. The top click interface and the bottom click interface may be aligned substantially vertically. The call may be configured to generate a clicking sound when the top click strikes the bottom click.

In some embodiments, the radiating arm may include an attachment point toward one distal end and the top click attached toward an opposite distal end of the arm. The arm may be semi-rigid. The arm may be resilient. There may be an angle α between the radiating arm and the top surface of the base.

The radiating arm may be resilient at one end to suspend the top click above the bottom click. The top and bottom click may be aligned to allow a temporary contact between the top and the bottom click when a pressure is applied by a user to the radiating arm. The radiating arm may be resilient enough to return the top click to its original, resting position suspended above the bottom click.

Some call embodiments may be configured to produce a unit of clicks when engaged repeatedly by a user. A unit of clicks may include about 10 to about 14 clicks in rapid succession.

The call may include securing mechanisms in contact with the base.

The call may be configured to produce clicking deer sounds.

The call may be configured to be used as a compliment to other animal calls. Specifically, the call may be intermittently used with a call that produces grunt sounds. The call is configured to mimic animal sounds. The call may be configured to mimic deer sounds. Animal sounds are typically recognized by avid hunters and may include, by way of example, grunts, bleats, bellows, a wheeze, rattling, sniffs, clicks, ticks, clucks, cuts, snorts, bawls, howls, yelps, cackles, gobbles, putts, and/or combinations thereof.

The call may be secured to a user, a gun, a bow and/or hunting equipment in some embodiments.

The disclosure also includes methods of assembling and using a hunting call. Also included and considered within the scope of the disclosure are methods of mimicking an animal call, for example a turkey and/or deer, and methods of generating animal clicking sounds.

In one example, a method for mimicking an animal call includes: (a) securing a base of the animal call; (b) applying pressure to a radiating arm having an attaching point to a surface of the base, such that the radiating arm moves toward the base; (c) moving a top click toward a bottom click; and (d) making contact between the top click and the bottom click sufficient to produce a sound. The call may be secured by holding the call in the hand of a user. The call may also have a securing mechanism that will secure it to the arm of a user, a gun, and/or for example a user's equipment.

These and other aspects of the present disclosure will become apparent to those skilled in the art after a reading of the following description of the preferred embodiment when considered with the drawings.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 1 is a side view of one example of a hunting call constructed according to the present disclosure;

FIG. 2 is a top view of one example of a hunting call constructed according to the present disclosure.

DESCRIPTION OF EMBODIMENTS

Figure 3:
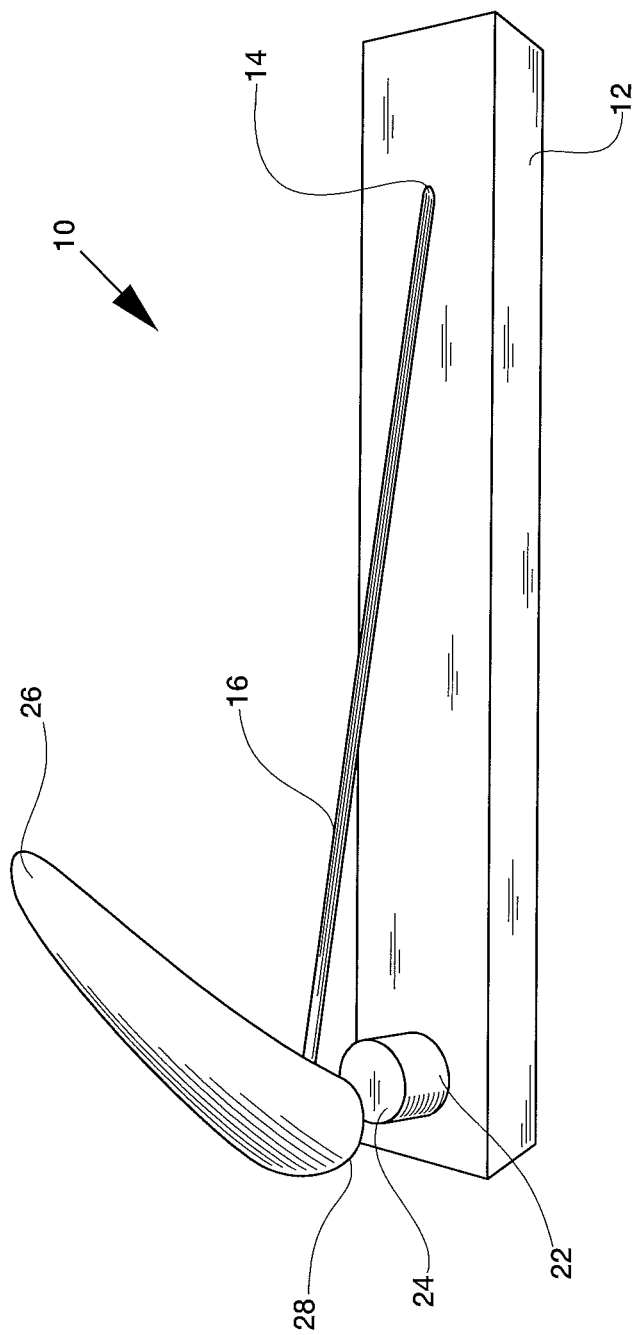
FIG. 3 is a top perspective view of one example of a hunting call constructed according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing embodiments of the disclosure and are not intended to limit the disclosure or any invention thereto.

FIG. 1 shows, a hunting call, generally designated 10, shown and constructed according to the present disclosure. The hunting call 10 includes a base 12, a base click 22, a radiating arm 16, and a top click 26.

The base 12 includes a top, a bottom, a first side, a second side, a first end and a second end. Base 12 is shown as a rectangular shape and typically may be configured as a rectangle, however, other base shapes are considered within the scope of this invention, for example, square, circular, oblong, and/or curved on any side. The base 12 may be made of any number of materials so that the base 12 may serve as a support. In one example, the base may be constructed of wood, bone, rock, plastic material and/or a combination of such materials.

A base click 22, in some examples, extends upward from the base 12, toward the top click 26, and includes a click interface 24. The base click 22 may be recessed into base 12. The base click 22 may be attached to base 12 in any number of ways, by way of example base click 22 may be embedded in base 12, attached to base 12, glued to base 12 with adhesive, nailed to base 12 and/or screwed to base 12. The click interface 24 is generally, in some examples, a flat surface. Click interface 24 in other examples may be textured, include a covering and/or incorporate a shape, for example, a curved surface. Base click 22, may by way of example, be made of a full or partial deer antler, and in other examples may be made of plastic, wood, metal, or any other suitable material able to produce a clicking sound when struck by the top click 26.

Radiating arm 16 is attached to base 12. Radiating arm 16, in some examples, attaches to base 12 on the top base surface, toward one base end. Radiating arm 16 may include an attachment point 14. Radiating arm 16 may be suspended from its attachment point over at least a portion of the length of base 12. Radiating arm 16 may be biased away from the base 12 as the arm extends away from the attachment point. The bias may be enough to suspend a top click 26 over the base 12 at a distance that, at rest, the top click 26 is spaced apart from the base 12 and/or the bottom click 22. The radiating arm 16 may extend away from its attachment point with the base at an angle $\alpha$. Angle $\alpha$ in some examples may be between about 1 degree and about 90 degrees. In other examples, angle $\alpha$ may be between about 5 degrees and about 50 degrees. Still in other examples, angle $\alpha$ may be between about 5 degrees and about 35 degrees. Radiating arm 16 may be a wire. The wire may be a semi-rigid wire. Radiating arm 16 may be flexible enough to allow the top click to contact the bottom click, yet resiliently semi-rigid enough to return to its original suspended position above the base.

Top click 26 may be secured to radiating arm 26. Top click 26, in one embodiment includes a click interface 28. The top click 26 may be attached to radiating arm 26 in any number of ways, by way of example radiating arm 16 may extend through top click 26, attach to arm 16, glue to arm 16, be nailed to arm 16 and/or screw to arm 16. The click interface 24 is generally, in some examples, a flat surface. Click interface 24 in other examples may be textured, include a covering and/or incorporate a shape, for example, a curved surface. Top click 26, may by way of example, be made at least partially of a deer antler. In other examples, top click 26 may be made of plastic, wood or metal, or any other suitable materials able to make a clicking sound when striking the bottom click 22.

The top click 26 and the bottom click 22 may be aligned and top click 26 suspended over the base so that the click interface 28 of the top click 22 and the click interface 24 of the bottom click 22 strike each other when the radiating arm 26 is depressed by a user. The top and bottom clicks, in some examples, are solid enough to sustain repeated contact between the top and bottom clicks.

The base 12 may include securing mechanisms on its side, sides or bottom surface that allow for the base 12 to be removably attached to a surface. For example, the securing mechanisms may be straps, Velcro attachments, ropes, etc. that secure the call 10 to a gun, user's arm, bow and/or hunting equipment.

In some examples, the base 10 may be between about 5 to about 10 inches in length. The base 10 may be between about 1 inch and about 5 inches in width. The base 10 may be between about 0.05 to about 3 inches in height. Typically, in some embodiments, the radiating arm 16 is shorter than the length of the base 10.

In operation, the hunting call 10 mimics animal sounds. In one example, the hunting call 10 is a hunting call generating repetitive clicking sounds. A hunter engages the radiating arm 16 and/or a back side of the top click 26 by depressing both or either toward the base 12. The top click 26 being aligned with the bottom click 26 strikes the bottom click 26, typically engaging the click interface surfaces 28, 24. The semi-rigid radiating arm 26 is resilient so that it returns to its start position to be depressed quickly by the user in sequential bursts to produce a series of about 10-12 clicking sounds in a click sound unit. The radiating arm 26 resiliently recovers, in some examples, so that it does not produce consecutive clicks in between user engagement, such that, a user presses the arm and one click is achieved, a user presses the arm and another click is achieved. The call 10 may be configured to produce the unit of clicks, in some embodiments, in under about a minute, in other embodiments in under about 30 seconds and, still in other embodiments, in under about 20 seconds. The clicking sound generated by the call 10 is audibly very different than the sounds produced by other types of calls, for example, a grunt, cackle, yelp, purr, rattle and/or a scraping sound.

Many hunting calls involve blowing into a call, which can require a lot of practice and skill, are often expensive, and may be difficult for many to use effectively. Applicant's call 10 produces animal calling sounds by way of an applied pressure and not by way of blowing into the call. Applicant's call 10 allows even a new user to control the call 10 and the sounds produced by the call easily and effectively. By using a different pressure, in some examples, a variation of sound may be produced in use. The tone of the sound may be variable and the sound patterns may be changed by varying pressure patterns.

Methods for making and using a hunting call as disclosed are considered within the scope of this disclosure. Specifically, methods for a clicking hunting call are disclosed.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. A hunting call able to mimic an animal sound comprising:
   (a) an elongated base having a top surface, a bottom surface, a first terminating end, a second terminating end, a height, and a length, wherein the bottom surface is flat for mating flush with a supporting surface and supporting the hunting call substantially horizontally upon the supporting surface;

(b) a flexible radiating arm having an attaching point to the top surface, the arm spanning a portion of the length of the base and at least a portion of the arm is biased away from the base top surface;

(c) a bottom click secured to the base at a portion of the base away from the attaching point of the radiating arm; and (d) a top click attached to the radiating arm on an opposite end of the attachment point of the arm to the top surface, wherein the top click interfacing with the bottom click is configured to mimic an animal sound.

2. The hunting call according to claim 1 wherein the bottom click includes a click interface.

3. The hunting call according to claim 2 wherein the top click includes a click interface.

4. The hunting call according to claim 3 wherein the top click interface and the bottom click interface are aligned substantially vertically.

5. The hunting call according to claim 4 wherein the call is configured to generate a clicking sound when the top click strikes the bottom click.

6. The hunting call according to claim 1 wherein a length of the radiating arm is less than the length of the base.

7. The hunting call according to claim 5 wherein the attachment point of the radiating arm is toward one distal end and the top click is attached toward an opposite distal end of the arm.

8. The hunting call according to claim 7 wherein the arm is semi-rigid.

9. The hunting call according to claim 8 wherein the arm is resilient.

10. The hunting call according to claim 9 including an angle α between the radiating arm and the top surface of the base.

11. The hunting call according to claim 10 wherein the call is configured to produce a unit of clicks when engaged repeatedly by a user.

12. The hunting call according to claim 11 wherein a unit of clicks includes about 10 to about 14 clicks in rapid succession.

13. The hunting call according to claim 12 wherein the unit of clicks occurs in about under 30 seconds.

14. The hunting call according to claim 11 including securing mechanisms in contact with the base to secure the base to a surface.

15. A hunting call for mimicking an animal sound to attract an animal comprising:

(a) a base having a top surface, a height, a width and a length, wherein said length is greater than said width;

(b) a resilient radiating arm having an attaching point to the top surface toward a first distal end, the arm spanning a portion of the length of the top surface of the base, and at least a portion of the arm is biased away from the base top surface to be separated from the top surface toward a second distal end;

(c) a bottom click secured to the base at a portion of the base away from the attaching point of the radiating arm; and (d) a top click attached to the radiating arm at an elongated side of the top click on an opposite end of the attachment point of the arm to the top surface, said top click and said bottom click each having a flattened face;

(e) wherein said top click and said bottom click are aligned vertically and a surface at the flattened face of said top click and a surface at the flattened face of said bottom click are configured to interact and create an animal sound when a pressure is applied to said resilient radiating arm.

16. A method for mimicking an animal call, comprising:

(a) securing a flattened bottom side of a base of the animal call to a support surface;

(b) applying pressure to a radiating arm biased away from the base and having an attaching point to a surface of the base, such that the radiating arm moves toward the base;

(c) moving a top click toward a bottom click; and (d) making contact between the top click and the bottom click sufficient to produce a sound that mimics an animal sound and serves as a hunting call for an animal.

17. The method for mimicking an animal call of claim 16 including interfacing a face of the top click with a face of the bottom click.

18. The method for mimicking an animal call of claim 17 including allowing the radiating arm to rebound to an original position and then applying a second pressure.

19. The method for mimicking an animal call of claim 18 including producing a repetitive series of sounds.

20. The method of mimicking an animal call of claim 19 wherein the repetitive sounds are clicking sounds.

* * * * *